Jan. 1, 1929.
H. W. BELL
FLEXIBLE COUPLING
Filed July 14, 1923
1,697,453
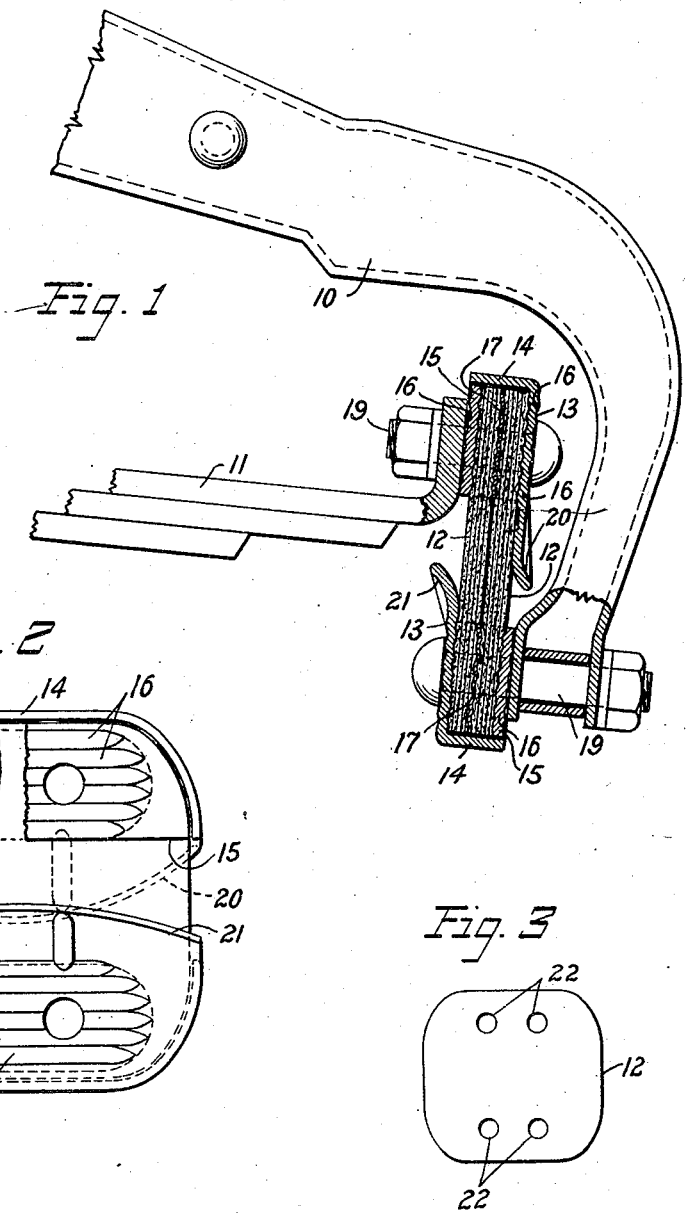
INVENTOR
Harvey W. Bell
BY
ATTORNEY Patented Jan. 1, 1929.

1,697,453

UNITED STATES PATENT OFFICE.

HARVEY W. BELL, OF ARDSLEY ON HUDSON, NEW YORK, ASSIGNOR TO THE BELCYT CORPORATION, OF DOVER, DELAWARE, A CORPORATION OF DELAWARE.

FLEXIBLE COUPLING.

Application filed July 14, 1923. Serial No. 651,597.

This invention relates to flexible couplings or connections and particularly to devices for use in connecting parts of a motor vehicle or vehicle chassis where it is desirable to provide for a limited relative movement between the connected parts.

The embodiment of the invention shown and described in this application is particularly adapted for use in connecting a vehicle spring to the vehicle chassis although the connection may be used for coupling other parts together, and is an improvement upon the invention disclosed in my pending application Serial No. 571,185, filed June 27, 1922, for spring shackles.

One of the objects of the invention is to provide a flexible connection or coupling so constructed and arranged as to permit a relative tilting movement between the connected parts and furthermore to provide a connection which will be noiseless and will require no lubrication or other attention.

Another object of the invention is to provide a coupling link or strip for flexible couplings of the type described so constructed and arranged as to be strongly resistant to flexure or distortion in the plane of the link but to permit bending or flexure transverse thereto.

Further objects of the invention will appear from the following description taken in connection with the drawings which form a part of this application and in which, Fig. 1 is a sectional elevation of one form of coupling constructed in accordance with the invention and illustrated as connecting a vehicle spring to a bracket adapted to be secured to the vehicle frame.

Fig. 2 is an elevational view partly broken away of the coupling shown in Fig. 1, and Fig. 3 is a plan view of one of the flexible links used in the coupling shown in Figs. 1 and 2.

In Fig. 1 there is illustrated at 10 a bracket adapted to be secured to the frame of the vehicle chassis and at 11 the rear end of the vehicle spring.

In the embodiment of the invention shown the shackle or coupling comprises two juxtaposed substantially flat strips 12 of flexible material such as rubber impregnated canvas belting or rubberized fabric. These strips are rigidly clamped together and are fixedly secured at their opposite ends to the spring 11 and bracket 10 respectively.

The clamps for securing the strips to the connected parts consist in the present disclosure of box-like holders or casings each comprising one member having a back wall 13 and laterally projecting rim or flange 14, this flange embracing the end portions of the side edges of the end of the flexible strips. Each holder or casing also includes a clamping plate 15 that fits within the flange 14.

The two parts or members of the box-like holder or casing are preferably formed of sheet metal and in order to effect a more secure clamping action on the flexible links the wall 13 of the plate 15 is corrugated as shown at 16. These corrugations however do not extend throughout the width of the members but are so located as to leave spaces at the ends thereof. A corrugated washer 17 is interposed between the strips on each end thereof and the gripping surfaces of these washers do not extend the full width of the links or strips as will be seen by referring to Fig. 2. It will be evident that there is left an area 18 at the side edges of the end portions of the links which will not be directly clamped by the bolts 19 which extend through the links and casings and secure the shackle to the spring and to the bracket.

To exert a certain measure of control over the flexure of the shackles or couplings and to snub the rebound action of the springs the back walls 13 are preferably provided with curved extensions 20 and 21 disposed in substantially overlapping relation at the opposite faces of each link.

Each of the links 12 is formed of rubberized fabric or rubber impregnated fabric material and is provided adjacent each end thereof with a pair of bolt receiving openings 22.

When the links are assembled in the manner shown the coupling is relatively stiff and substantially nonflexible in its flat plane and is rigidly held at its opposite ends thereby preventing side sway and other objectionable movements. The coupling is however flexible in planes transverse thereto thereby providing the desired freedom of action of the spring.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claim.

What I claim is:—

A flexible coupling comprising a relatively flat link strongly resistant to flexure in the plane thereof, but flexible transversely of said plane, and means for clamping an end of the link, comprising a sheet metal clamping member having corrugations stamped therethrough to provide a corrugated clamping face and stiffening reinforcement, a reinforcing or stiffening flange along a portion of the edge of the clamping member, said flange also serving as an enclosing wall for the link, said member being curved to form a lip in the remaining edge portion, said lip extending in a direction opposite to that of the flange.

In witness whereof, I have hereunto set my hand this 11th day of July, 1923.

HARVEY W. BELL.